United States Patent [19]

Ackeret

[11] E Re. 30,184

[45] Reissued Jan. 8, 1980

[54] HOLDERS FOR TAPE CASSETTES

[75] Inventor: Peter Ackeret, Küsnacht, Switzerland

[73] Assignee: IDN Inventions and Development of Novelties AG, Lenzerheide, Switzerland

[21] Appl. No.: 957,200

[22] Filed: Nov. 2, 1978

Related U.S. Patent Documents

Reissue of:

[64] Patent No.: 4,030,601
Issued: Jun. 21, 1977
Appl. No.: 582,118
Filed: May 30, 1975

[30] Foreign Application Priority Data

Jun. 5, 1974 [DE] Fed. Rep. of Germany ..... 2427109

[51] Int. Cl.[2] ..... B65D 85/672
[52] U.S. Cl. ..... 206/387; 312/319
[58] Field of Search ..... 206/387; 312/319

[56] References Cited

U.S. PATENT DOCUMENTS

| | | | |
|---|---|---|---|
| 3,532,211 | 10/1970 | Gellert | 206/387 |
| 3,664,492 | 5/1972 | Wallace | 206/387 |
| 3,677,396 | 7/1972 | Staar | 206/387 |
| 3,743,374 | 7/1973 | Glass | 312/319 |
| 3,836,222 | 9/1974 | Kuntze | 312/319 |
| 3,924,742 | 12/1975 | Primicerio et al. | 206/387 |

*Primary Examiner*—Joseph Man-Fu Moy
*Attorney, Agent, or Firm*—H. Dale Palmatier

[57] ABSTRACT

A housing with one side open to form an entrance for a tape cassette, a slider within the housing and movable toward and away from the entrance, a spring pressing the slider toward the entrance, a latch retaining the spring cassette in the housing against the pressure of said spring, reel-retaining inserts for insertion into the hub of the tape spools, the inward and outward movement relative to the spool hubs being controlled by movement of the slider in the housing, in certain instances the insert being mounted on the slider and in other instances the insert being mounted on the housing.

13 Claims, 9 Drawing Figures

Figures 1, 2:
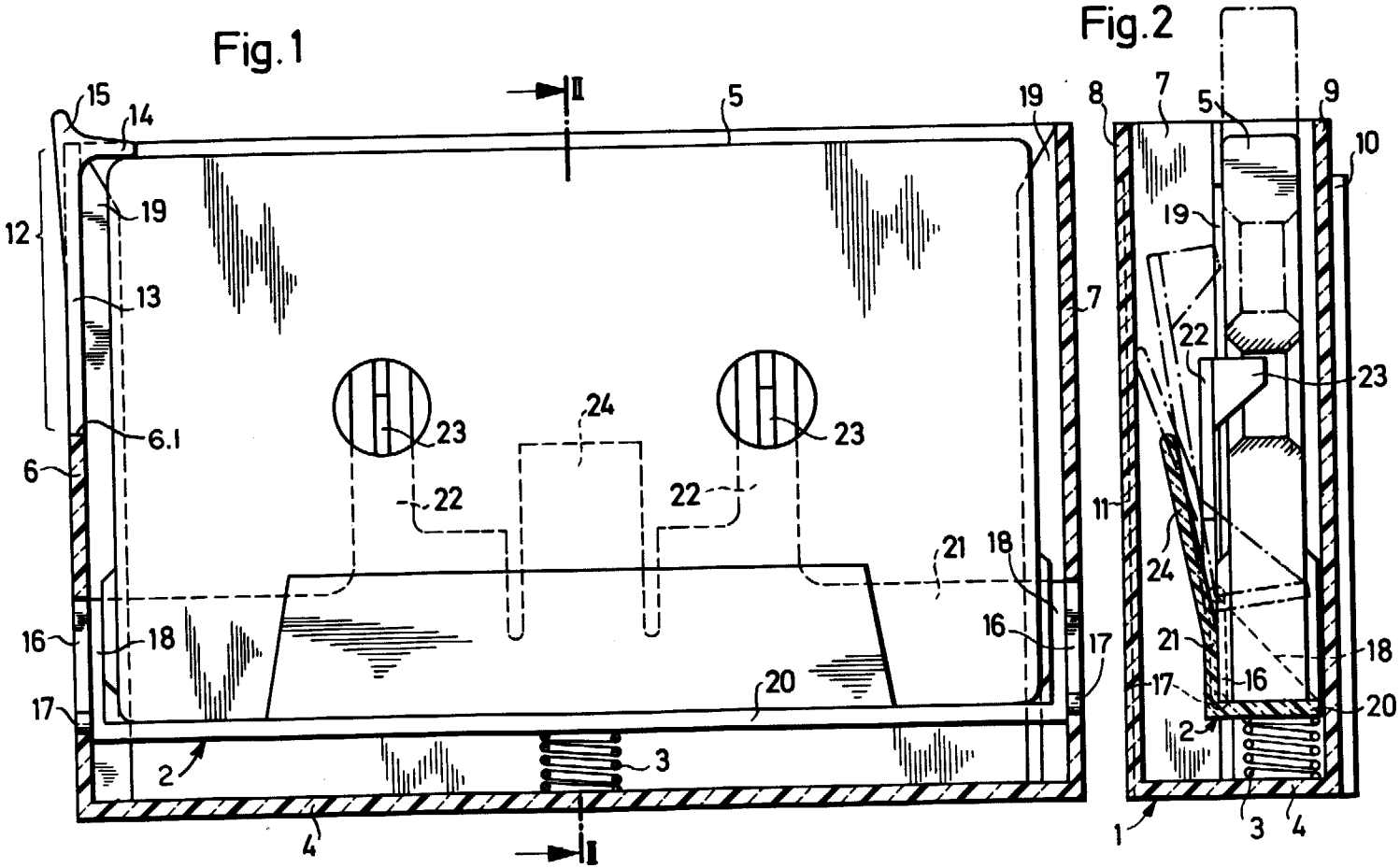

7
9
10
37
29
3
5
34
4
8
11
27
32
33
28
26
2
35
1

7
37
30
29
1
8
18
27
32
34
36
III
26
35
3
5
33
III
31
35
4
34
27
32
26
36
2
14
15
13
37
30
12
6

10
9
5
8
11
46
56,57
47
48
52
49
2
53
3
4

VI
8
5
2
55
46
47
56
52
48
49
53
58
50
3
4
1
54
13
51
14
15
12
6

73
64
5
9
10
11
8
71
70
66
2
69
72
67
3
4

64
7
68
1
4
71
69
72
70
67
73
66
3
IX
5
IX
70
69
14
13
15
12
6
68

HOLDERS FOR TAPE CASSETTES

Matter enclosed in heavy brackets [ ] appears in the original patent but forms no part of this reissue specification; matter printed in italics indicates the additions made by reissue.

The present invention relates to holders for tape cassettes, for example magnetic tape cassettes, and the like and is in the form of a rectangular housing open on one long narrow side, with locking members for the tape spools of the cassette which are pivoted into the spool apertures of the cassette when the latter is pushed in, and are pivoted out of the spool apertures when the cassette is pushed out. The pivoting movements of the locking members are controlled by means of an L-shaped slider which is supported so that it is movable in the direction of the movement of the cassette, and has a pressure spring acting on it.

A tape cassette has been proposed which has a series of adjacent chambers, formed by means of drawn-in partitions, each of which accommodates one cassette and into which the cassettes that are to be stored are pushed from the front. In order that the cassettes should be held firmly in the chambers and the unwinding and take-up spools for the tape should be locked, on a side wall of each chamber an L-shaped slider is supported so that it is longitudinally movable, and the slider has two apertures arranged one behind the other in the direction of movement of the slider. The apertures have associated with the corresponding apertures in the adjacent side wall to allow room for the movement of two blades attached to the slider which have locking cams for the cassette spools.

A leaf spring which is led through an aperture in the base and is attached to the base acts on the angled transverse shank of the slider. The stored cassettes project forwards out of the magazine so that they can be grasped laterally with the fingers and pulled out.

When the cassette is pulled out, the slider is also pulled with it for a short distance, and then, assisted by the spring, reaches a position in which the cams pivot out of their locking position, whereupon the cassette can be pulled out without hindrance.

The object of the present invention is to create a cassette holder out of which the cassettes no longer partly project in the inserted state and are exposed to the risk of dirt and other damage, and which in addition will offer the advantage that the cassette is particularly easy to remove.

According to the invention the dimensions of the housing are such that it takes in the cassette completely, and the slider is constructed as a transport slider so that when the blocking means holding the cassette in its inserted position is released the slider automatically conveys the cassette in advance into a position in which it is easy to grasp.

Figure 4:
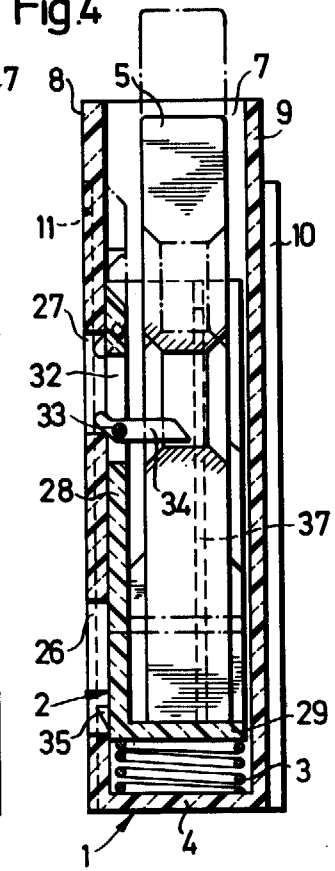
Figure 3:
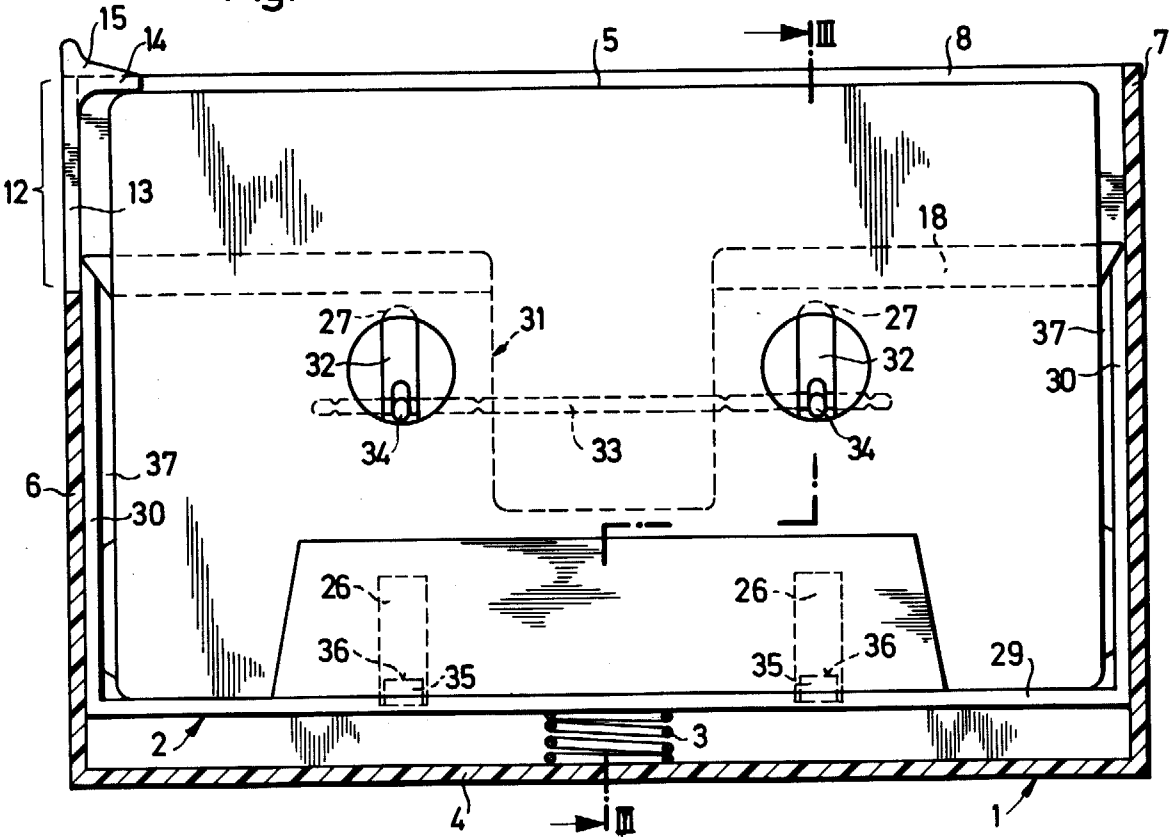
Figure 6:
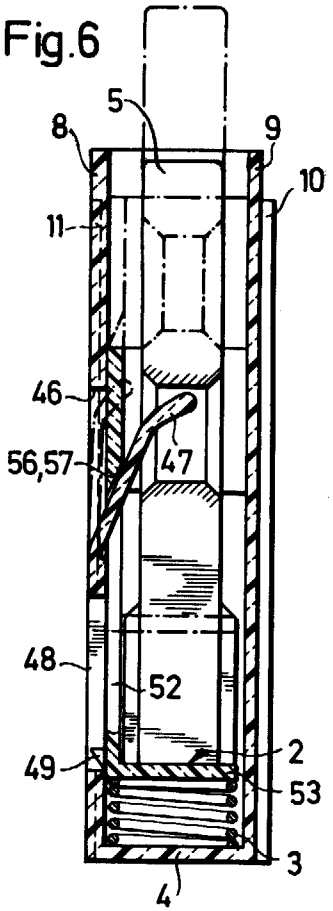
Figure 5:
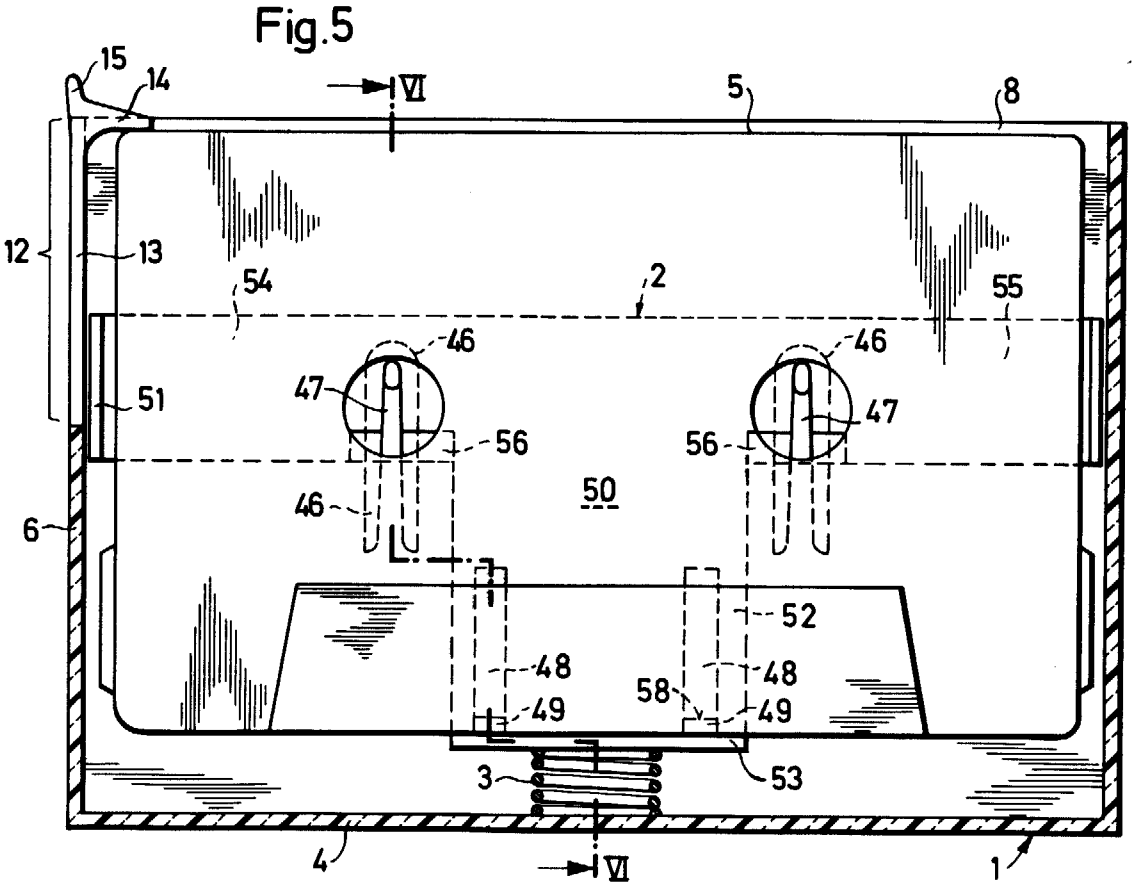
Figure 7:
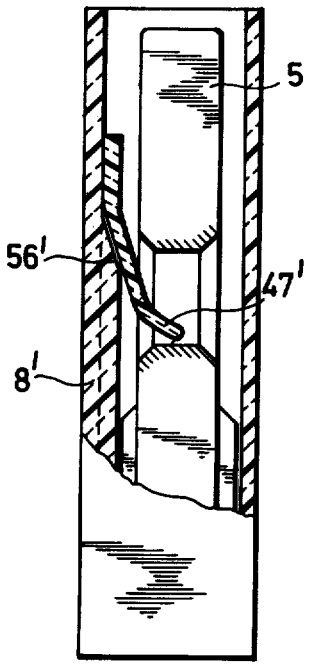
Figure 9:
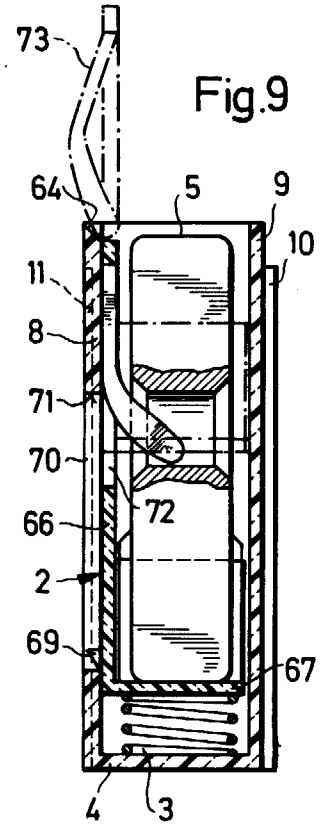
Figure 8:
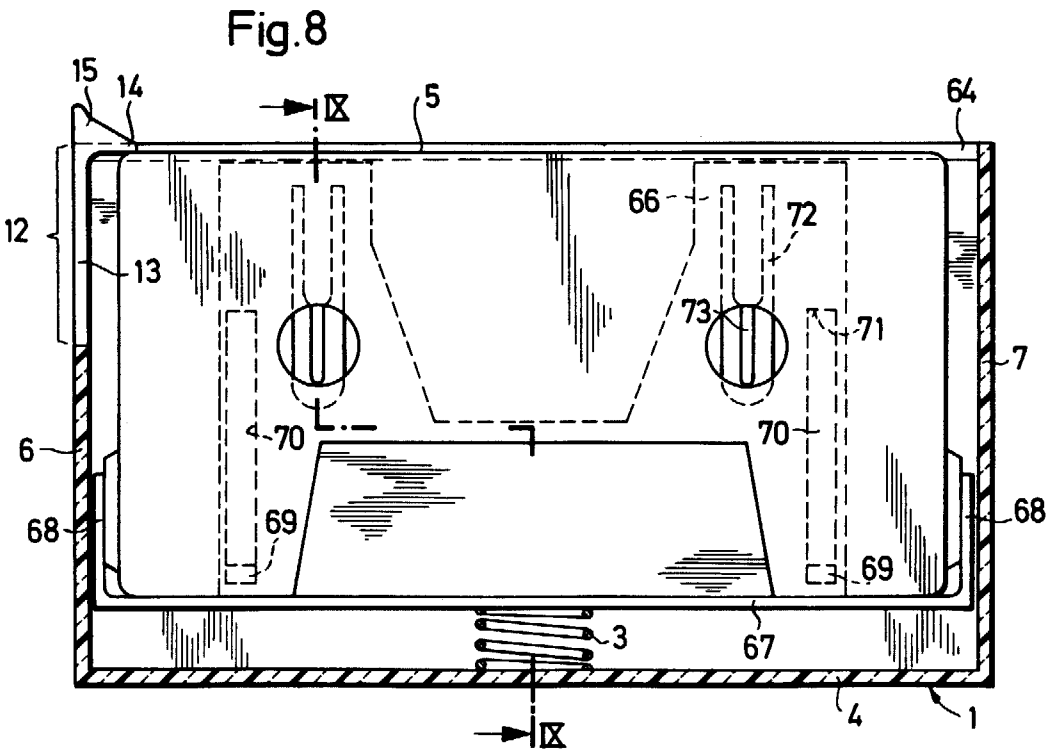

By way of example only embodiments of the invention will now be described in more detail with reference to the accompanying drawings of which:

FIGS. 1 and 2 show respectively a first embodiment of the invention in longitudinal section and cross-section along the line II—II in FIG. 1, FIGS. 3 and 4 show respectively a second embodiment of the invention in longitudinal section and in cross-section along the line III—III in FIG. 3, FIGS. 5 and 6 show respectively a third embodiment of the invention in longitudinal section and in cross-section along the line IV—IV in FIG. 5, FIG. 7 shows a fourth embodiment of the invention in a diagrammatic cut-off cross-section, FIGS. 8 and 9 show respectively a fifth embodiment of the invention in longitudinal section and in cross-section along the line V—V in FIG. 8.

The holder consists of three parts, i.e., a one-piece housing 1, a transport slider 2, and a pressure spring 3. The housing 1 has a base 4, opposite which the housing 1 is substantially open to form an entrance or open front side for the insertion and removal of a cassette 5, narrow end walls 6 and 7, and side walls 8 and 9. On the outside of the wall 9 strips 10 are arranged which preferably have a dovetail-shaped cross-section, whilst on the outside of the wall 8 there are grooves 11 which match the strips 10. Several similar holders may be stacked and combined to form a unit by pushing together the inerlocking elements 10, 11.

The end wall 6 is provided along a length 12 from the housing entrance and parallel to the walls 8, 9 with two parallel slots 6.1 defining a flexible spring tongue 13 therebetween. Such slots are located in the area between an adjoining rib 19 and the side wall 9. Part of the end wall 6 can therefore be flexibly deflected with respect to the remainder of the end wall so that a spring tongue 13 is produced. The spring tongue 13 has a lug 14 to keep the cassette 5 locked into the inserted position, whilst the key 15 facilitates deflection of the tongue.

In the embodiment shown in FIGS. 1 and 2, the thickness of the inside of the housing between the two walls 8 and 9 is greater than the width of the cassette 5 at its widest point. Space is then provided for ribs 19 (which project inwards from the inside of each end wall 6 and 7, so that when being inserted and removed the cassette 5 is guided between the ribs 19 and the wall 9 substantially parallel to the side walls.

The end walls 6 and 7 have slots 16 which are aligned with one another and run parallel to the walls 8, 9, and the length of which limits the ejection movement of the transport slider 2 which is restrained by pin like extensions 17 of the transport slider 2 are guided in the slots 16.

The transport slider 2 has an approximately L-shaped cross-section with triangular reinforcing lugs 18. Between its transverse shank 20 and the base 4 of the housing the pressure spring 3 is stressed and is positioned so that it is off-set towards the wall 9. The transverse shank or rear wall 20 on which the pressure spring 3 acts operates as a lever arm which is pivotable about the axis of the pin extensions 17. The other shank 21 of the transport slider has two projections 22, each of which carries an inwardly-pointing retainer cam 23. When the cassette is pushed in, these cams engage in the core apertures of the cassette 5 and lock them. Between the projections 22 there is a tongue 24 which— as is apparent from FIG. 2—is inclined outwardly from the plane of the shank 21. The shank 21 as a whole rests on the side of the ribs 19 furthest from the cassette 5 so that it can execute the tilting movement mentioned previously. The front side of the slider 2, opposite the rear wall 20, is open and unobstructed to permit the cassette 5 to slide off the slider 2 when the retainer cams 23 are tilted or swung out of the core apertures.

In order to store the cassette, after displacing the spring tongue 13 laterally from the long edge of the cassette where the tape is exposed and must be protected, the cassette is pushed into the space between the wall 9 and the ribs 19. When the cassette meets the transverse shank 20 of the transport slider 2, the spring 3 is compressed and the transport slider is tilted into the position shown by solid lines in FIG. 2; the cams 23 are thereby pivoted into the core apertures. As soon as the cassette has been pushed into the position shown by solid lines in FIG. 1, the spring tongue 13 springs back and holds the cassette firmly with its lug 14. The spring 3 remains compressed.

If the spring tongue 13 is deflected laterally, perhaps with the finger, the spring 3 pushes the transport slider outwards, and with it the cassette 5. As soon as the pin extensions 17 reach the end of the slots 16, the transport slider cannot be pushed any further, and tilts about the axis of the pin extensions, so that the cams 23 emerge from the core apertures of the cassette. The tilting movement is limited by the tongue 24 meeting the inside of the covering wall 8. The tongue 24 is displaced just so far out of the plane of the shank 21 that when the tongue rests against the covering wall 8 the cams 23 do in fact free the cassette 5 but still rest against it with some friction. This prevents the cassette from being hurled out; due to this frictional retardation it is instead lightly clamped in a convenient position to be grasped. Removal causes no difficulty, since the tongue 24 can yield resiliently when the thickened part of the cassette is pulled over the cams 23.

Both the housing 1 and the transport slider 2 consist of a thermoplastic plastics material. It is understood that both elements can be produced by means of injection moulds which have relatively few cut-backs so that the tools can be correspondingly low-cost.

In the embodiment shown in FIGS. 3 and 4, the wall 8 has two groups of two slots each, parallel to the direction of movement of the cassette 5. The first group comprises the guide slots 26, which are intended to limit the travel of the transport slider 2, whilst the second group comprises the control slots 27. In the embodiment, a slot 26 is provided in line with each slot 27, but this is not essential. More than two slots 26 may also be provided.

The transport slider 2 is in the shape of a drawer with a base 28, impact wall 29 and lateral guide walls 30. In order to save material, the base 28 is provided with a cut-out 31. Counter-slots 32 are formed in the base 28 of the transport slider, parallel to the control slots 27. Parallel to the counter-slots 32, near the end nearest the impact wall 29, a thin spindle 33 on which are pivoted retaining levers 34 which are pivotable through 90° and are aligned with the control and counter-slots 27 and 32.

The longer lever arms of the retaining levers 34 engage in the core apertures of the tape coil spools of the cassette 5 when the latter is pushed in, as indicated by solid lines in FIG. 4. The shorter lever arms project into the control slots 27 associated with them and are slightly angled. Finally, stops 35 are moulded on the base 28 of the transport slider which are aligned with the guide slots 26 of the wall 8 of the housing.

To assemble the holder, first the spring 3 is inserted into the housing 1; guides (not shown) may be provided for the spring to prevent it from kinking. The levers 34 are then moved over with their long lever arm counter to the insertion direction, so that they substantially disappear in the counter-slots 32 of the transport slider. The position of the spindle 33 and the length of the levers and of the slots are calculated to correspond. The transport slider 2 can now be introduced into the housing with slight pressure, with the wall 8 of the housing being flexibly deformed towards the outside and the base 28 of the transport slider 2 towards the inside to a certain extent. This is possible since both parts are made of a suitable thermoplastic plastic material—preferably polystyrene. This deformation is caused by the stops 35, the oblique surfaces of which facilitate the insertion of the transport slider.

When the transport slider is pushed in far enough, the stops 35 drop into the guide slots 26. The stop surfaces 36 of the stops 35 running normal to the plane of the base 28 prevent the transport slider from being pulled out again without the above mentioned flexible deformation being produced by hand. Since the short lever arm of the retaining levers 34 is slightly angled, they also project somewhat out of the counter-slots during assembly and then drop into the associated control slots 27. The levers cannot yet right themselves, since the spindles 33 are still in front of the control slots 27. This position of the slider 2 is indicated by dash-dotted lines in FIG. 4.

A cassette 5 can now be pushed in, laterally deflecting the spring tongue 13. The cassette first meets the inside of the impact wall 29 of the transport slider. When a slight pressure is exerted inwards on the cassette the transport slider is now pushed in further, counter to the spring 3, until the short lever arms of the retaining levers 34 run onto the end edge of the control slots 27. The retaining levers are thereby pivoted out of the upright position out of the base 28 so that the long lever arms engage in the core apertures and secure the tape spools. In this position of the transport slider 2 with the cassette 5, the spring 3 is almost fully compressed, and the cassette has reached a position in which the lug 14 can spring back and over the outer edge of the cassette. The cassette is thus held and the spring 3 remains compressed for the ejection operation.

In order to initiate the latter, the key 15 is pressed outwards a little by hand. The spring 3 can then push the transport slider 2 outwards, with the cassette 5, whereupon the short lever arms of the retaining levers 34 meet the other end edge of the control slots 27 and thereby pivot the levers back into a position which is approximately parallel to the direction of movement and recessed into the base 28. The cassette is not catapulted out, since its movement is retarded by lateral strips 37; it can however be completely pulled out. The strips are moulded on the inside of the guide walls 30 of the transport slider.

In the embodiment shown in FIGS. 5 and 6, two slots 46 with an approximately U-shaped are formed in the covering wall 8. The two tongues 47 acting like leaf springs which are thus formed are obliquely angled in the direction of the inside of the housing, and assume the rest position shown by dash-dotted lines in FIG. 6.

In addition, the wall 8 has two guide slots 48 parallel to the insertion direction of the cassette 5 and a stop tooth 49 of the transport slider 2 is guided in each slot.

The transport slider 2 has a base 50 which is approximately T-shaped, and at each end of a shank an angled support section 51, 53 is provided.

The stop teeth 49 are moulded on the longitudinal shank 52, and the helical spring 3 presses on the support section 53 of this shank. The transverse shanks 54, 55 effect the lateral guiding of the transport slider and the retention of the cassette 5. In addition, they each have, near the central longitudinal shank 52, an oblique control surface 56, the cutting edge 57 of which faces towards the covering wall 8 of the housing 1.

Assembly is carried out by first inserting the spring 3 into the housing 1. The transport slider is then pushed into the housing 1, with the base 50 being deformed slightly inwards and the wall 8 deformed slightly outwards. This flexible deformation is ensured by the choice of a suitable plastics material for both parts. As soon as the stop teeth 49 reach the guide slots 48 they drop into the latter and the flexible deformation disappears. The transport slider is then in the position indicated by dash-dotted lines in FIG. 6.

The holder is now ready to receive a cassette; the transport slider cannot be pushed out by the spring 3 since the stop surfaces 58 of the stop teeth 49 rest against the end edge of the guide slots 48. If a cassette 5 is now pushed in whilst gently pushing the spring tongue 47 away sideways, the cassette first meets the inside surface of the support section 53 facing the cassette. When it is pushed in further, the transport slider is pushed further into the housing 1, compressing the spring 3. The oblique control surfaces 56 thereby engage behind the tongues 47, lift the latter inwards out of the base 8, and push them into the core apertures of the cassette, with which the tongues 47 are aligned. The tape spools are thus locked. The tongues are thereby flexibly deformed and return to their rest position when the cassette is removed. For this purpose it is sufficient if the lug 14 of the tongue 13, which has hitherto held the cassette in the inserted position and the spring 3 tensioned, is lifted away from the cassette 5 by exerting slight lateral pressure on the key 15, so that the spring 3 can expand, whereupon the transport slider 2 returns to the position indicated by dash-dotted lines. In order that the cassette should not be catapulted out, braking springs (not shown) can be provided.

FIG. 7 shows how the reverse arrangement of the tongues 47' can be provided on the transport slider and the control surfaces 56' on the base 8' of the housing. In this case it is necessary, as is easily apparent, to reverse the direction in which the tongues extend, and thus they here point away from the insertion aperture of the holder.

In the embodiment shown in FIGS. 8 and 9 the spring 3 rests on the one hand against the inside of the base 4, and on the other hand on the transverse shank 67 of the transport slider 2 nearest the base 4, and is compressed in the storage position shown. The transport slider 2 is substantially L-shaped in cross-section, with a longitudinal shank 66, the transverse shank 67 and lateral guide surfaces 68. From the surface of the longitudinal shank 66 two stop teeth 69 extend in the direction of the wall 8 of the housing 1 into guide slots 70 which are formed in the wall 8. The end edges 71 of the slots 70, facing the holder aperture, serve as stops for the ejection movement of the transport slider. In addition, in the surface of the longitudinal shank 66 of the transport slider 2 two apertures 72 extending lengthwise in the ejection direction are provided, and from the end of these near the holder aperture two retaining levers 73 extend. These retaining levers are bent out of the plane of the shank 66 and assume the rest position indicated by dash-dotted lines in FIG. 9, out of which they can be flexibly bent into the position shown by solid lines.

In order to assemble the holder explained this far, first the spring 3 is inserted into the housing 1; in order that the spring should not kink, guides (not shown) are preferably provided. The transverse slider is then pushed in, for which purpose the lug 14 is bent aside, until the stop teeth 69 meet the front edge of the wall 8. Since the teeth 69 have an oblique surface, the transport slider can be pushed in further with increased pressure. As soon as the teeth 69 reach the guide slots 70 they fall into the latter.

The holder is now ready to receive a cassette 5. The cassette is placed on the transport slider and pushed into the housing with slight pressure. The retaining levers thereby meet an oblique surface 64 on the free edge of the wall and are pushed inside the housing, whereupon they engage in the core apertures of the cassette and lock the tape spools. When the cassette 5 is pushed in far enough (FIG. 8) the lug 14 snaps over the edge of the cassette and holds the cassette firmly. To remove the cassette, the lug is pushed outward with the key 15 so that the spring 3 ejects the transport slider with the cassette; the retaining levers 73 thereby return to their rest position and free the cassette 5. The ejection movement of the cassette 5 can be retarded by means which are not shown. The transport slider is pushed out until the stop teeth 69 engage with the end edges 71.

It should be emphasized that with this embodiment no additional space is required in the housing for the pivoting out of the retaining lever.

What we claim is:

[1. A holder for tape cassettes and the like, the holder comprising a housing having at least one compartment with an open front side to slidably receive a slider in the compartment, a slider in the housing and adapted to linearly transport a cassette into and out of said compartment, the slider having a cassette-engaging rear wall spaced inwardly from said open front side of the housing and the slider having an open and unobstructed front side permitting removal of the cassette from the slider by sliding movement and without tilting, stop means to limit the length of sliding movement of said slider, locking means being provided to hold the slider in its compartment against the force exerted by a spring in the housing and urging the slider into its open position, and cassette reel retention members brakingly engaging into the cassette reel apertures when said slider is locked, said retention members being pivotable in a plane perpendicular to the direction of sliding in response to and upon movement of the slider into its open position thereby disengaging from said reel apertures.]

2. A holder [according to claim 1, in which] *for tape cassettes and the like, the holder comprising a housing having at least one compartment with an open front side to slidably receive a slider in the compartment, a slider in the housing and adapted to linearly transport a cassette into and out of the compartment, the slider having a cassette-engaging rear wall spaced inwardly from said open front side of the housing and the slider having an open and unobstructed front side permitting removal of the cassette from the slider by sliding movement and without tilting, stop means to limit the length of sliding movement of said slider, locking means being provided to hold the slider in its compartment against the force exerted by a spring in the housing and urging the slider into open position, and cassette reel retention members brakingly engaging into the cassette reel apertures when said slider is locked, said retention members being pivotable in a plane perpendicular to the direction of sliding in response to and upon movement of the slider into its open position thereby disengaging from said reel apertures,* the reel retention members are on the slider and extend toward the open front side of the housing from said rear wall, said reel retention members being pivotable within the housing to tilt out of the reel apertures, and the housing being divided by means of ribs projecting inwards from walls of the housing into two chambers, said ribs extending toward the open front side and parallel to the direction of sliding movement of the slider and cassette, the first of said chambers accommodating the cassette and the other of the chambers accommodating the tilting movement of said reel retention members as the transport slider moves in the housing.

3. A holder according to claim 2, in which the transport slider has aligned pin extensions adjacent opposite ends of said rear wall, said pin extensions having associated with them slots in the adjacent side walls of the housing and running in the direction of movement of the slider and cassette to limit the ejection movement of the transport slider, and said pin extensions pivotally mounting the transport slider to permit tilting of the retention members into and out of the cassette reel apertures.

4. A holder according to claim 3, in which the pin extensions and slots are disposed adjacent both chambers and adjacent the ribs therebetween, and said resilient means bearing against the rear wall of the transport slider in said first chamber and in off-centre relation to the pivot axis extending through said pin extensions whereby to tilt the slider under influence of the resilient means to withdraw the retention members from the reel apertures, and means on the slider and adjacent the retention members to limit tilting of the slider in the housing.

5. A holder [according to claim 1, in which] *for tape cassettes and the like, the holder comprising a housing having at least one compartment with an open front side to slidably receive a slider in the compartment, a slider in the housing and adapted to linearly transport a cassette into and out of the compartment, the slider having a cassette-engaging rear wall spaced inwardly from said open front side of the housing and the slider having an open and unobstructed front side permitting removal of the cassette from the slider by sliding movement and without tilting, stop means to limit the length of sliding movement of said slider, locking means being provided to hold the slider in its compartment against the force exerted by a spring in the housing and urging the slider into open position, and cassette reel retention members brakingly engaging into the cassette reel apertures when said slider is locked, said retention members being pivotable in a plane perpendicular to the direction of sliding in response to and upon movement of the slider into its open position thereby disengaging from said reel apertures,* the transport slider is L-shaped, with lateral guide walls, forms a drawer which has in its base a pair of counterslots in which retaining levers are pivotably supported as locking members in alignment with slots in the opposite wall of the housing.

6. A holder according to claim 5, in which stops are moulded on the base to limit the ejection movement of the slider in co-operation with aligned guide slots in the adjacent covering wall.

7. A holder [according to claim 1, in which] *for tape cassettes and the like, the holder comprising a housing having at least one compartment with an open front side to slidably receive a slider in the compartment, a slider in the housing and adapted to linearly transport a cassette into and out of the compartment, the slider having a cassette-engaging rear wall spaced inwardly from said open front side of the housing and the slider having an open and unobstructed front side permitting removal of the cassette from the slider by sliding movement and without tilting, stop means to limit the length of sliding movement of said slider, locking means being provided to hold the slider in its compartment against the force exerted by a spring in the housing and urging the slider into open position, and cassette reel retention members brakingly engaging into the cassette reel apertures when said slider is locked, said retention members being pivotable in a plane perpendicular to the direction of sliding in response to and upon movement of the slider into its open position thereby disengaging from said reel apertures,* the transport slider is T-shaped and has moulded on the back of its longitudinal shank stop teeth which have guide slots in the side wall of the housing associated with them, and in which tongues are cut out of the covering wall and angled towards the inside of the housing, and have associated with them oblique control surfaces on the transverse shanks of the transport slider.

8. A holder [according to claim 1, in which] *for tape cassettes and the like, the holder comprising a housing having at least one compartment with an open front side to slidably receive a slider in the compartment, a slider in the housing and adapted to linearly transport a cassette into and out of the compartment, the slider having a cassette-engaging rear wall spaced inwardly from said open front side of the housing and the slider having an open and unobstructed front side permitting removal of the cassette from the slider by sliding movement and without tilting, stop means to limit the length of sliding movement of said slider, locking means being provided to hold the slider in its compartment against the force exerted by a spring in the housing and urging the slider into open position, and cassette reel retention members brakingly engaging into the cassette reel apertures when said slider is locked, said retention members being pivotable in a plane perpendicular to the direction of sliding in response to and upon movement of the slider into its open position thereby disengaging from said reel apertures,* the transport slider is T-shaped and has moulded on the back of its longitudinal shank stop teeth which have guide slots in the covering wall associated with them, and in which tongues are cut out of the transverse shanks of the transport slider and angled towards the inside of the housing, and have associated with them control surfaces on the covering wall.

9. A holder [according to claim 1, in which] *for tape cassettes and the like, the holder comprising a housing having at least one compartment with an open front side to slidably receive a slider in the compartment, a slider in the housing and adapted to linearly transport a cassette into and out of the compartment, the slider having a cassette-engaging rear wall spaced inwardly from said open front side of the housing and the slider having an open and unobstructed front side permitting removal of the cassette from the slider by sliding movement and without tilting, stop means to limit the length of sliding movement of said slider, locking means being provided to hold the slider in its compartment against the force exerted by a spring in the housing and urging the slider into open position, and cassette reel retention members brakingly engaging into the cassette reel apertures when said slider is locked, said retention members being pivotable in a plane perpendicular to the direction of sliding in response to and upon movement of the slider into its open position thereby disengaging from said reel apertures,* the transport slider has on the back of its longitudinal shank stop teeth which have guide slots in the covering wall associated with them, and in which levers aligned with the core apertures of the cassette are cut out of the longitudinal shank, which are bent out of the plane of the longitudinal shank and when the cassette is pushed in are pivoted with their free ends into the core apertures to lock the tape spools.

10. A holder [according to claim 1, in which] *for tape cassettes and the like, the holder comprising a housing having at least one compartment with an open front side to slidably receive a slider in the compartment, a slider in the housing and adapted to linearly transport a cassette into and out of the compartment, the slider having a cassette-engaging rear wall spaced inwardly from said open front side of the housing and the slider having an open and unobstructed front side permitting removal of the cassette from the slider by sliding movement and without tilting, stop means to limit the length of sliding movement of said slider, locking means being provided to hold the slider in its compartment against the force exerted by a spring in the housing and urging the slider into open position, and cassette reel retention members brakingly engaging into the cassette reel apertures when said slider is locked, said retention members being pivotable in a plane perpendicular to the direction of sliding in response to and upon movement of the slider into its open position thereby disengaging from said reel apertures,* on the open side of the housing accommodating the cassette, the locking means engages over the inserted cassette and is arranged on one end wall of the housing.

*11. A holder for tape cassettes and the like, the holder comprising a housing having at least one compartment with an open front side to slidably receive a slider in the compartment, a slider in the housing and adapted to transport a cassette into and out of said compartment, the slider having a cassette-engaging rear wall spaced inwardly from said open front side of the housing, stop means to limit the length of sliding movement of the slider, locking means being provided to hold the slider with a cassette in its compartment against the force exerted by a spring in the housing and urging the slider into its open position, at least one cassette reel retention member brakingly engaging into a cassette reel aperture when said slider is locked, said one retention member being mounted at said slider rear wall and being pivotable, together with said rear wall in a plane perpendicular to the direction of sliding in response to and upon movement of the slider into its open position and thereby disengaging from said reel apertures.*

*12. A holder according to claim 11 and including a pair of juxtaposed ribs spaced from each other in the compartment and extending substantially parallel to the direction of sliding movement of the slider and cassette, the ribs dividing the compartment into adjoining first and second chambers, the first of said chambers receiving the cassette and slider to accommodate the sliding movement thereof, and the second of the chambers accommodating the tilting movement of the reel retention member when pivoted out of the reel aperture of the cassette.*

*13. The holder according to claim 12 wherein the rear wall of the slider has a side edge confronting and moving along the ribs in the compartment, the slider being pivotable about an axis extending along said elongated side edge of the rear wall, the spring exerting a tilting torque upon said rear wall to tilt the slider and withdraw the retention member from the reel aperture when the slider and cassette move toward the open front side of the housing.*

*14. A holder for tape cassettes and the like, the holder comprising a housing having at least one compartment with an open front side to slidably receive a slider in the compartment, a slider in the housing and adapted to transport a cassette into and out of said compartment, the slider having a cassette-engaging rear wall spaced inwardly from said open front side of the housing, stop means to limit the length of sliding movement of the slider, locking means being provided to hold the slider with a cassette in its compartment against the force exerted by a spring in the housing and urging the slider into its open position, at least one cassette reel retention member brakingly engaging into a cassette reel aperture when said slider is locked, said slider extending substantially to said open housing front side, at least one cassette reel retention member extending from a slider portion adjacent said open housing front side into a cassette reel aperture in braking engagement therewith when the slider is in its inner position, said reel retention member disengaging from said aperture by tilting in a plane perpendicular to the direction of sliding once the slider has moved along a predetermined path of the housing.*

* * * * *